United States Patent
Cho

(10) Patent No.: US 6,840,599 B1
(45) Date of Patent: Jan. 11, 2005

(54) METHOD FOR PROCESSING AN IMAGE IN A PRINTER

(75) Inventor: Young Kyoo Cho, Suwon (KR)

(73) Assignee: Korea Printing Systems Co., Ltd. (KR)

( * ) Notice: Subject to any disclaimer, the term of this patent is extended or adjusted under 35 U.S.C. 154(b) by 0 days.

(21) Appl. No.: 10/674,973

(22) Filed: Sep. 29, 2003

(30) Foreign Application Priority Data

Jul. 10, 2003 (KR) ................................ 10-2003-0046813

(51) Int. Cl.$^7$ ................................................. B41J 2/21
(52) U.S. Cl. ......................................................... 347/43
(58) Field of Search ............................. 347/15, 19, 43

(56) References Cited

U.S. PATENT DOCUMENTS

| | | |
|---|---|---|
| 5,740,333 A | 4/1998 | Yoh et al. |
| 6,206,504 B1 | 3/2001 | Payne |
| 6,502,923 B2 | 1/2003 | Payne |
| 6,523,937 B1 * | 2/2003 | Payne ........................ 347/43 |

* cited by examiner

Primary Examiner—Thinh Nguyen
(74) Attorney, Agent, or Firm—Webb Ziesenheim Logsdon Orkin & Hanson, P.C.

(57) ABSTRACT

A method for processing an image in a printer, which can effectively carry out a conversion operation by comparing quantities of light components for R (Red), G (Green) and B (Blue) associated with each pixel to be converted when a two or more-color image is converted into a two-color image, and can decide conversion colors by applying a regular rule to all possible cases when the conversion colors are decided, such that an excellent conversion result can be achieved. In the method, a primary color and a secondary color are set as printable colors in the printer and an original image is inputted. Color difference values associated with the primary color, the secondary color and a white color are produced on an original image pixel-by-pixel basis, and a corresponding pixel color of the original image is converted into the primary, secondary or white color associated with a smallest color difference value.

8 Claims, 11 Drawing Sheets

METHOD FOR PROCESSING AN IMAGE IN A PRINTER

BACKGROUND OF THE INVENTION

1. Field of the Invention

The present invention relates to a method for processing an image in a printer, which can carry out a printing operation in two colors, and more particularly to a method for processing an image in a printer, which can effectively carry out a conversion operation by comparing quantities of light components for R (Red), G (Green) and B (Blue) associated with each pixel to be converted when a full color image is converted into a two-color image, and can decide conversion colors by applying a regular rule to all possible cases when the conversion colors are decided, such that an excellent conversion result can be achieved.

2. Description of the Related Art

Conventionally, an ECR (Electric Cash Register) or POS (Point-Of-Sale) system is equipped with a small-sized printer for printing a receipt. In this case, widely used printers include a dot printer for creating a shape of a character by electronically pushing an end of a wire bundle separately driven by an electromagnet and printing characters on a paper by striking an ink ribbon, and a thermal printer using a thermal paper for performing a printing operation by sensing heat generated from a head. The above-described printers can mostly perform only a monochrome (black or purple) printing operation. Recently, an improved dot printer, thermal printer and ink jet printer capable of performing a two-color printing operation have been developed.

Furthermore, a recently used small-sized printer has extended a range of use from printing a receipt for verifying a transaction history to printing a predetermined company logo, a specific image for marketing promotion or a ticket. According to this trend, colorful prints are required.

However, since the conventional printer is limited by a size requirement and can carry out a printing operation in only one color or two colors, the conventional printer cannot print a full-color logo or advertisement image as it is. For this reason, research on techniques for performing a conversion to a one or two-color image so that the conventional small-sized printer can print a multi-color logo or image is ongoing.

As one example, U.S. Pat. No. 5,740,333 discloses an image processing method and image processing apparatus which can convert an inputted color image to a two-color image so that the two-color image consisting of a specified color and a black color can be outputted by a copying machine, facsimile machine and printer. The inputted color image is separated into three colors of R (Red), G (Green) and B (Blue). In the above-described U.S. Pat. No. 5,740,333, a predetermined threshold value based on the specified color and two correction values are compared with quantities of light associated with the colors separated from the inputted color image, and one of the specified color and the black color is decided for each pixel of the inputted color image so that the inputted color image can be converted into the two-color image.

In the method of the above-described U.S. Pat. No. 5,740,333, the black color is basically used and the specified color is limited to a red or blue color. Since only two colors are compared at the color conversion operation, there is a problem in that the color conversion operation is limitedly carried out.

As other examples, U.S. Pat. Nos. 6,206,504 and 6,502,923 disclose a two-color ink jet apparatus and method in a POS (Point-Of-Sale) system. In the apparatus and method, a primary color and alternative color are decided in advance. Then, first, second and third color values separated from an inputted color image are compared with a given threshold value according to predetermined criteria. According to a result of the comparison, one of the primary color and alternative color to be outputted is decided, or no color is selected. As a result, an image consisting of a white color, primary color and alternative color is outputted.

In the method of the above-described U.S. Pat. Nos. 6,206,504 and 6,502,923, there are problems in that different results for the same image can be produced since the criteria for deciding the primary color and alternative color are unclear and a boundary area in which two colors can meet all criteria is not defined.

SUMMARY OF THE INVENTION

The present invention overcomes the above problems by providing a method for processing an image in a printer, which can effectively carry out a conversion operation by comparing quantities of light components for R, G and B associated with a pixel to be converted when a full color image is converted into a two-color image, and can decide conversion colors by applying a regular rule to all possible cases when the conversion colors are decided, such than an excellent conversion result can be achieved.

In accordance with an aspect of the present invention, the above and other objects can be accomplished by the provision of a method for processing an image in a printer capable of printing a two-color image, comprising the steps of: setting a primary color and a secondary color as printable colors in the printer; receiving an original image; and producing color difference values associated with the primary color, the secondary color and a white color on an original image pixel-by-pixel basis, and converting a corresponding pixel color of the original image into the primary, secondary or white color associated with a smallest color difference value.

Preferably, the color converting step may comprise the steps of:

on the pixel-by-pixel basis, calculating a first color difference value $\Delta Col1$ between the corresponding pixel color of the original image and the primary color according to the equation $\Delta Col1 = |R_0 - R_1| + |G_0 - G_1| + |B_0 - B_1| - Vcb$, calculating a second color difference value $\Delta Col2$ between the corresponding pixel color of the original image and the secondary color according to the equation $\Delta Col2 = |R_2 - R_0| + |G_2 - G_0| + |B_2 - B_0| - Vcs$, and calculating a third color difference value $\Delta Col3$ between the corresponding pixel color of the original image and the white color according to the equation $\Delta Col3 = |255 - R_0| + |255 - G_0| + |255 - B_0|$, wherein $R_o$, $G_o$ and $B_o$ are RGB values of the corresponding pixel color of the original image, $R_1$, $G_1$ and $B_1$ are RGB values of the primary color, $R_2$, $G_2$ and $B_2$ are RGB values of the secondary color, values of 255 are RGB values of the white color, Vcb is a weight value for the primary color, Vcs is a weight value for the secondary color, and the weight values Vcb and Vcs are arbitrarily set; and converting the corresponding pixel color into a conversion color associated with the smallest color difference value of the calculated color difference values $\Delta Col1$, $\Delta Col2$ and $\Delta Col3$.

Preferably, the color converting step may comprise the steps of:

setting an arbitrary color to a boundary color;

on the pixel-by-pixel basis, calculating a first color difference value $\Delta Col1$ between the corresponding pixel color of the original image and the primary color according to the equation $\Delta Col1 = |R_0 - R_1| + |G_0 - G_1| + |B_0 - B_1| - Vcb$, calculating a second color difference value $\Delta Col2$ between the corresponding pixel color of the original image and the secondary color according to the equation $\Delta Col2 = |R_{th} - R_0| + |G_{th} - G_0| + |B_{th} - B_0| - Vcs$, and calculating a third color difference value $\Delta Col3$ between the corresponding pixel color of the original image and the white color according to the equation $\Delta Col3 = |255 - R_0| + |255 - G_0| + |255 - B_0|$, wherein Ro, Go and Bo are RGB values of the corresponding pixel color of the original image, $R_1$, $G_1$ and $B_1$ are RGB values of the primary color, $R_{th}$, $G_{th}$ and $B_{th}$ are RGB values of the secondary color, values of 255 are RGB values of the white color, Vcb is a weight value for the primary color, Vcs is a weight value for the secondary color, and the weight values Vcb and Vcs are arbitrarily set;

comparing the calculated color difference values and producing the smallest color difference color; and converting the corresponding pixel color into the primary color if the first color difference value $\Delta Col1$ is smallest, converting the corresponding pixel color into the secondary color if the second color difference value $\Delta Col2$ is smallest, and converting the corresponding pixel color into the white color if the third color difference value $\Delta Col3$ is smallest.

Preferably, the method may further comprise the step of: converting the received original image into a bitmap image before the color converting step is carried out.

Preferably, the color converting step may comprise the step of: deciding a conversion color according to priorities in order of the primary, secondary and white colors if two or more of the first, second and third color difference values correspond to the smallest color difference value as a result of the comparison.

Preferably, the weight value for the primary color may be set to be large if a ratio of the primary color is desired to be increased in the two-color image, and wherein the weight value for the secondary color may be set to be large if a ratio of the secondary color is desired to be increased in the two-color image.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, a preferred embodiment of an image processing method in a printer in accordance with the present invention will be described in detail with reference to the accompanying drawings. Here, a POS (Point-Of-Sale) printer will be explained as an example.

Figure 10:
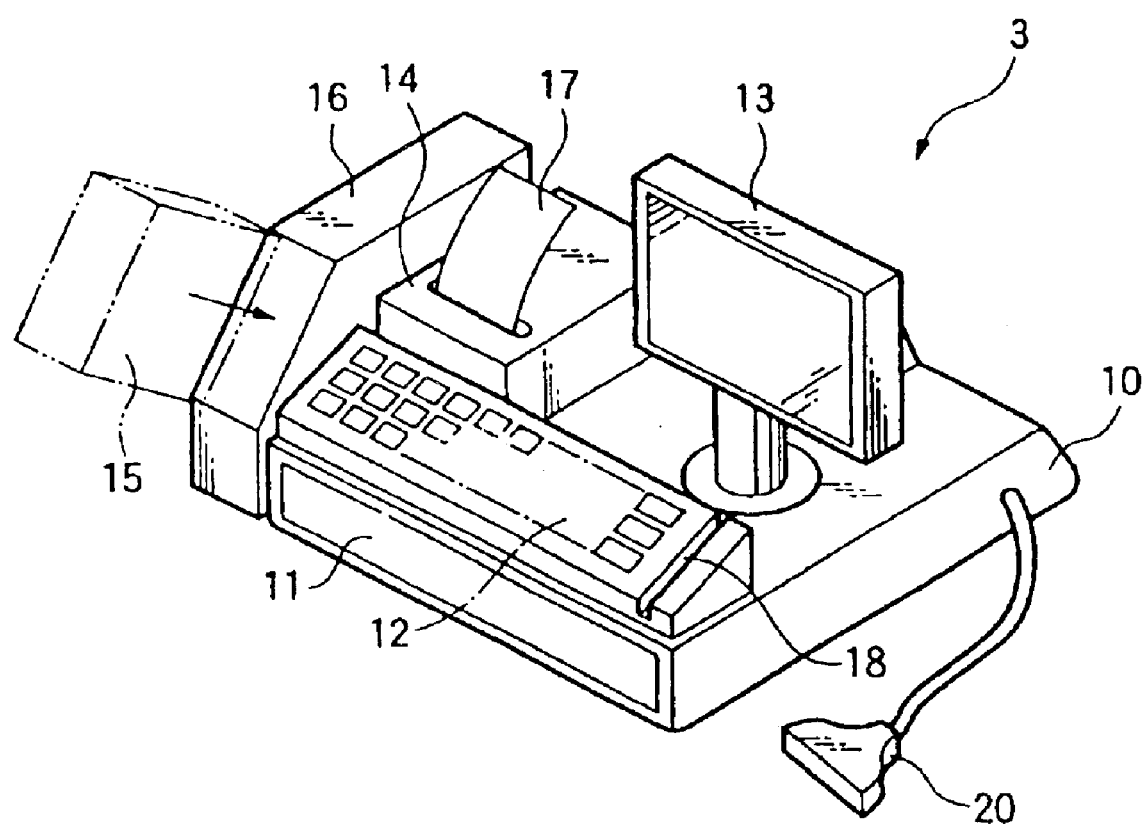
FIG. 10 is a schematic perspective view illustrating a POS (Point-Of-Sale) terminal to which the present invention is applicable.

FIG. 10 is a front perspective view illustrating a POS terminal 3 to which the image processing method in accordance with the present invention is applicable. The POS terminal 3 can include a main unit case 10 having a rectangular parallelepiped shape and a cash drawer contained therein. A manipulation keyboard 12 is mounted on a top surface in a front direction of the main unit case 10, and can receive information associated with a product or purchaser from an operator. A display unit 13 for displaying an operation state and a printer 14 for printing a receipt can be appropriately installed behind the keyboard 12. The POS terminal 3 further includes a bar code reader 20 for reading a linear bar code formed on a product and a card reader 18 for reading a card for credit-card transaction. The POS terminal 3 includes a display unit for a customer (not shown) so that a purchaser can confirm brief contents such as a payment amount, etc. before the purchaser pays money. The display unit for the customer can be installed behind the main unit case 10. A speaker (not shown) also can be installed behind the main unit case 10.

Here, the printer 14 is a two-color printer such as a small-sized ink-jet, thermal or dot printer.

Figure 11:
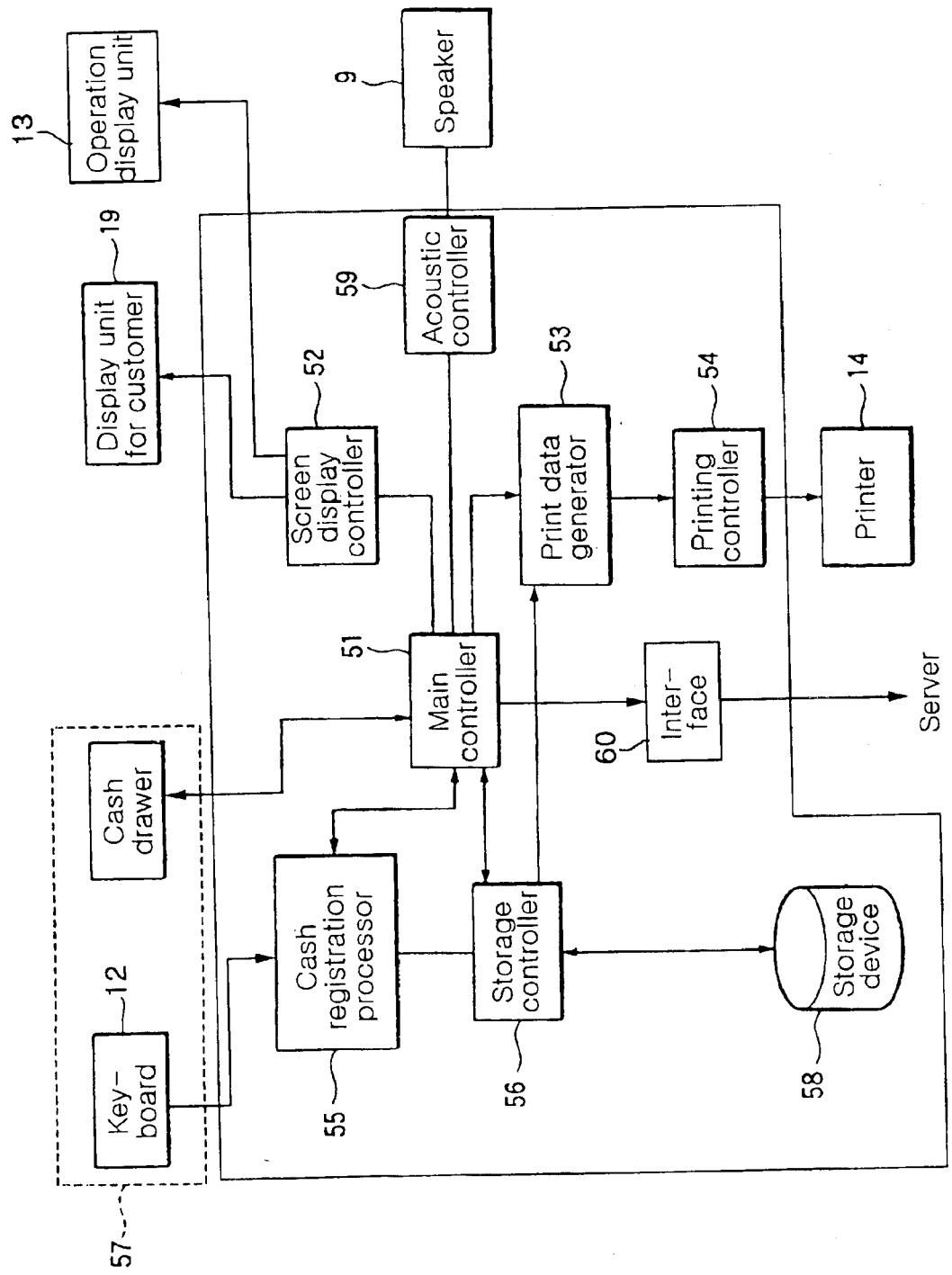
FIG. 11 is a block diagram illustrating a control section of the POS terminal 3. The control section includes a main controller 51 for activating and controlling the POS terminal 3. The main controller 51 controls operations of elements of the POS terminal 3 that includes a display controller 52, an acoustic controller 59, a print data generator 53, a printing controller 54, a cash register processor 55, a storage controller 56 and a storage device 58.

FIG. 11 is a block diagram illustrating the configuration of a control section of the POS terminal 3. The control section includes a main controller 51 for activating and controlling the POS terminal 3. The main controller 51 controls operations of elements of the POS terminal 3 that includes a display controller 52, an acoustic controller 59, a print data generator 53, a printing controller 54, a cash register processor 55, a storage controller 56 and a storage device 58.

Programmed software for a ROM (Read Only Memory) or RAM (Random Access Memory) not shown in FIG. 11 is mounted in the POS terminal 3 so that the programmed software can be executed by a microprocessor.

The image processing method of the present invention described below is implemented by software. Under the control of the main controller 51, the image processing method is mainly performed by the print data generator 53.

The print data generator 53 receives information of a receipt to be printed from the main controller 51, and receives advertisement information (e.g., a predetermined logo or image) based on at least three colors stored in the storage device 58 through the storage controller 56. Then, the print data generator 53 generates print data. Then, the print data generator 53 converts an inputted full-color image corresponding to the print data into a two-color image and then issues a printing command so that the printer 14 can carry out an appropriate printing operation.

Under the control of the printing controller 54, the printer 14 prints the print data transferred from the print data generator 53 on a predetermined paper.

Next, the image processing method of the present invention performed by the print data generator 53 will be described in detail with reference to FIGS. 1 to 9.

Figure 1:
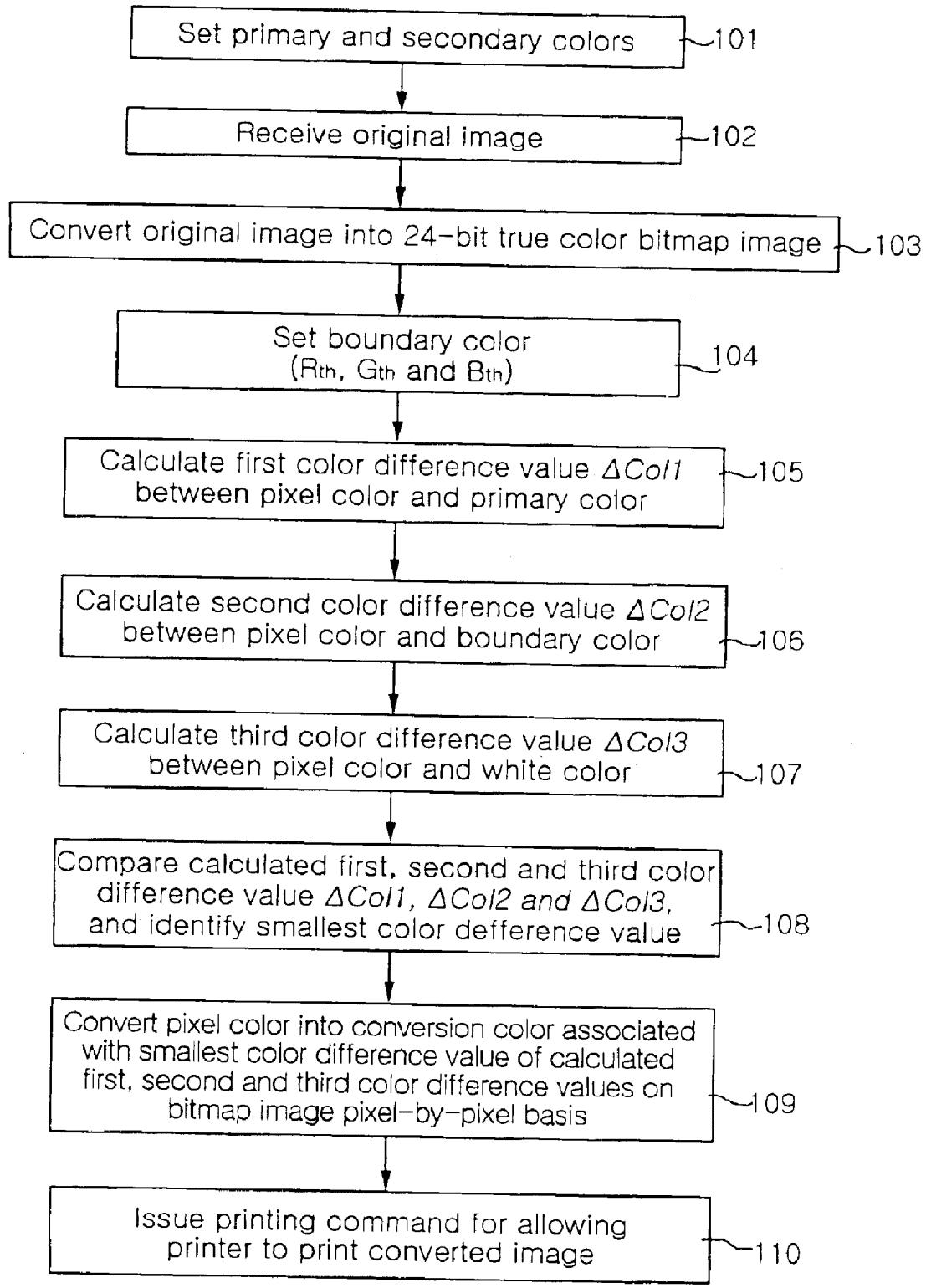
FIG. 1 is a flow chart illustrating an image processing method in a printer in accordance with the present invention.

FIG. 1 is a flow chart illustrating the image processing method for converting a full color image into a two-color image.

At step 101 as an initialization step, a primary color being a main color and a secondary color being a sub-color to be printed are set. The primary and secondary colors are colors capable of being printed by the-printer 14. The primary color is mainly used for printing a text, etc., and the secondary color is used for printing contents to be emphasized or additional contents.

At step 102, an original image to be printed is inputted. At this time, the original image is based on a three-color image and various image formats.

If the original image is inputted, the inputted image is appropriately converted into a predetermined format image at step 103. The inputted original image is converted into a 24-bit true color bitmap image. Pixel values of the converted original image are referred to as Ro, Go and Bo. If the inputted original image is based on RGB values capable of being processed, the above step 103 can be omitted.

At step 104, a color forming a boundary is set, and is referred to as a boundary color. The boundary color does not correspond to a threshold value for determining whether or not a color must be converted, but becomes a criterion for designating a color of the original image to be converted into the secondary color.

Figure 2:
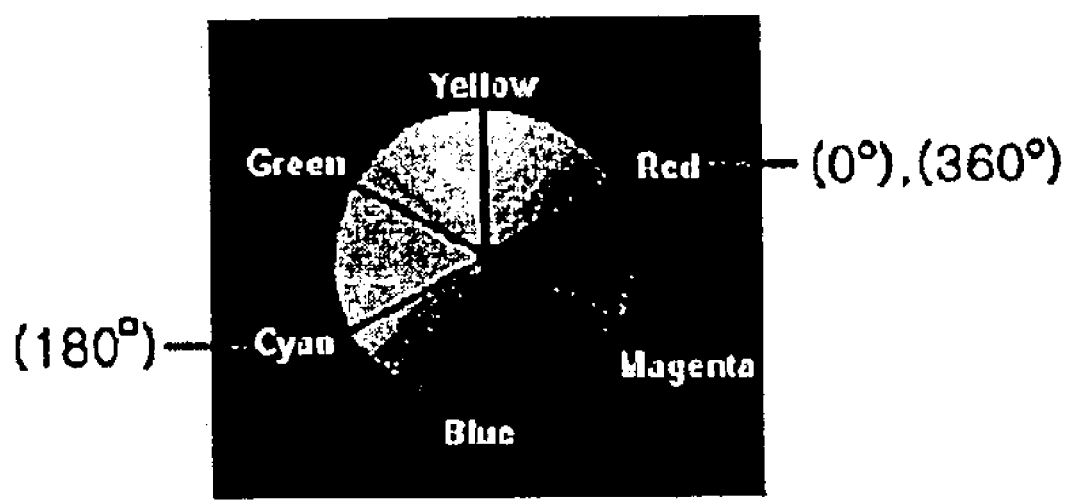
FIG. 2 is a view illustrating a color circle.

As shown in FIG. 2, R (Red), G (Green) and B (Blue) being three primary colors arranged at 120° intervals, and mixed colors depending upon ratios of RGB components, form a color circle. The boundary color can be selected from the color circle. A value of Red is indicated by a reference rotation angle 0°. Rotation angles from the reference rotation angle 0° in a counter clock-wise direction are expressed as values of designated colors. For example, if a value of the boundary color is set as a rotation angle 180°, the boundary color becomes a cyan color. The rotation angle 0° or 360° corresponds to Red. A predetermined rotation angle set in the color circle shown in FIG. 2 is referred to as a boundary value, a color corresponding to the boundary value is a boundary color, and the boundary color is expressed as RGB values $R_{th}$, $G_{th}$ and $B_{th}$.

For example, if the primary and secondary colors are designated as the black and red colors in two colors to be printed and the boundary value is a rotation angle 60°, the boundary color becomes a yellow color. The yellow color of the original image is converted into the secondary color, i.e., the red color.

Where the boundary color is designated as the secondary color, a result is the same as that where the boundary color is not designated. In other words, the step of designating the boundary color can be omitted if desired. However, where the boundary-color designating step is omitted, an operation of converting RGB values $R_{th}$, $G_{th}$ and $B_{th}$ of the boundary color into $R_2$, $G_2$ and $B_2$ of the secondary color needs to be performed in a procedure of calculating color difference values described below.

If the boundary color is designated as described above, there are calculated color difference values associated with the primary color, the boundary color being a criterion for a conversion to the secondary color and a white color on an original image pixel-by-pixel basis. A corresponding pixel color of the original image is converted into a conversion color having the smallest color difference value among the three colors (including the primary, secondary and white colors). These operations are performed at steps 105 to 110. Thus, the above steps 105 to 110 are performed for all pixels of the original image. Furthermore, the reason why the color difference value between the white color and the corresponding pixel color is calculated is because a paper to be printed is white, and colors viewed on a receipt actually printed by the POS terminal are the primary, secondary and white colors.

A procedure on an original image pixel-by-pixel basis will be described in detail step by step.

First, at step 105, a color difference value $\Delta Col1$ between the corresponding pixel color and the primary color is produced. The color difference value $\Delta Col1$ is calculated by the following Equation 1.

$$\Delta Col1 = |R_0 - R_1| + |G_0 - G_1| + |B_0 - B_1| - Vcb \qquad \text{Equation 1}$$

In the above Equation 1, Vcb denotes a weight value for the primary color, i.e., the black color, and can be arbitrarily set. The weight value for the primary color is used for deciding an amount of the color to be expressed as the primary color when the original image is converted into the two-color image. For example, as the weight value Vcb for the primary color becomes large, a ratio of the primary color becomes large in the converted image, and conversely a ratio of the secondary color becomes small in the converted image. In other words, an operation of heightening the probability that a difference value between the original-image pixel color and the primary color becomes smaller than that between the original-image pixel color and the secondary or white color is carried out so that a ratio of the black color becomes larger in the two-color image. $R_1$, $G_1$ and $B_1$ denote RGB values of the primary color, respectively.

Typically, the primary color is set as the black color, and RGB values of the black color are zero. At this time, an equation of calculating the color difference value between the corresponding pixel color and the primary color is given by $\Delta Col1 = R + G + B - Vcb$.

Then, at step 106, a color difference value $\Delta Col2$ between the corresponding pixel color and the secondary color is produced. The above-described color difference value $\Delta Col2$ is calculated by the following Equation 2.

$$\Delta Col2 = |R_{th} - R_0| + |G_{th} - G_0| + |B_{th} - B_0| - Vcb \qquad \text{Equation 2}$$

In the above Equation 2, $R_{th}$, $G_{th}$ and $B_{th}$ denote color values of the boundary color set at the above step 104. Vcs denotes a weight value for the secondary color, and can be arbitrarily decided. When the value of Vcs becomes large, the probability that the corresponding pixel color is converted into the secondary color becomes high. Conversely, when the value of Vcs becomes small, the probability that the corresponding pixel color is converted into the secondary color becomes low.

The reason why color values of the corresponding pixel are compared with RGB values of the boundary color rather than RGB values of the secondary color is because the boundary color being the criterion color to be converted into the secondary color is designated and an original image color corresponding to the boundary color is converted into the secondary color. A color difference value between the boundary color to be actually converted and the corresponding pixel color is calculated.

Then, at step 107, a color difference value $\Delta Col3$ between the white color and the corresponding pixel color is calculated by the following Equation 3.

$$\Delta Col3 = |255 - R_0| + |255 - G_0| + |255 - B_0| \qquad \text{Equation 3}$$

In the above Equation 3, values of 255 are RGB values for the white color. At this time, where a ratio of the white color becomes large, an actual image cannot be appropriately expressed. A weight value is assigned in the case of the primary or secondary color, but is not assigned in the case of the white color.

Then, at step 108, the three color-difference values ΔCol1, ΔCol2 and ΔCol3 are compared, and the smallest color difference value is identified. The conversion color, i.e., the primary, secondary or white color, corresponding to the smallest color difference value is closest to the original-image pixel color. This embodiment uses the smallest color difference value. However, the largest color difference value can be optionally used. Where the largest color difference value is used, relations between the weight values for the primary and secondary colors and the ratios of the primary and secondary colors in the two-color image are opposite to those in the case where the smallest color difference value is used. In other words, as the weight value becomes smaller, the ratio of the primary or secondary color in the two-color image becomes larger.

If desired, the weight values Vcb and Vcs for the primary and secondary colors are not assigned so that a two-color image closest to the original image can be printed.

Then, at step 109, the corresponding pixel color is converted into the primary, secondary or white color corresponding to the smallest color difference value. For example, where the first color difference value ΔCol1 is the smallest color difference value, the corresponding pixel color is converted into the primary color. Further, where the second color difference value ΔCol2 is the smallest color difference value, the corresponding pixel color is converted into the secondary color. Furthermore, where the third color difference value ΔCol3 is the smallest color difference value, the corresponding pixel color is converted into the white color.

Where two or more values of the color difference values ΔCol1, ΔCol2 and ΔCol3 correspond to the smallest color difference value, priorities for the same smallest color difference values are designated in order of the primary, secondary and white colors. Conversion colors are decided according to the designated priorities. It is preferable that priorities for the conversion colors corresponding to the same smallest color difference values are designated in order of the primary, secondary and white colors. Where the same color difference values exist, the corresponding pixel color is converted into a conversion color having a higher priority.

Finally, if the original image is completely converted into the two-color image after the above steps 105 to 109 are performed on a pixel-by-pixel basis, a printing command for allowing the printer 14 to print the two-color image as the converted image is issued at step 110. The printing command is sent to the printing controller 54 shown in FIG. 11. The printing controller 54 controls an operation of the printer 14 so that the printer 14 can appropriately print the two-color image.

A result of the conversion based on the image processing method in accordance with the present invention will be described with reference to the original image shown in FIG. 3 and simulation results shown in FIGS. 4 to 9.

Figure 3:
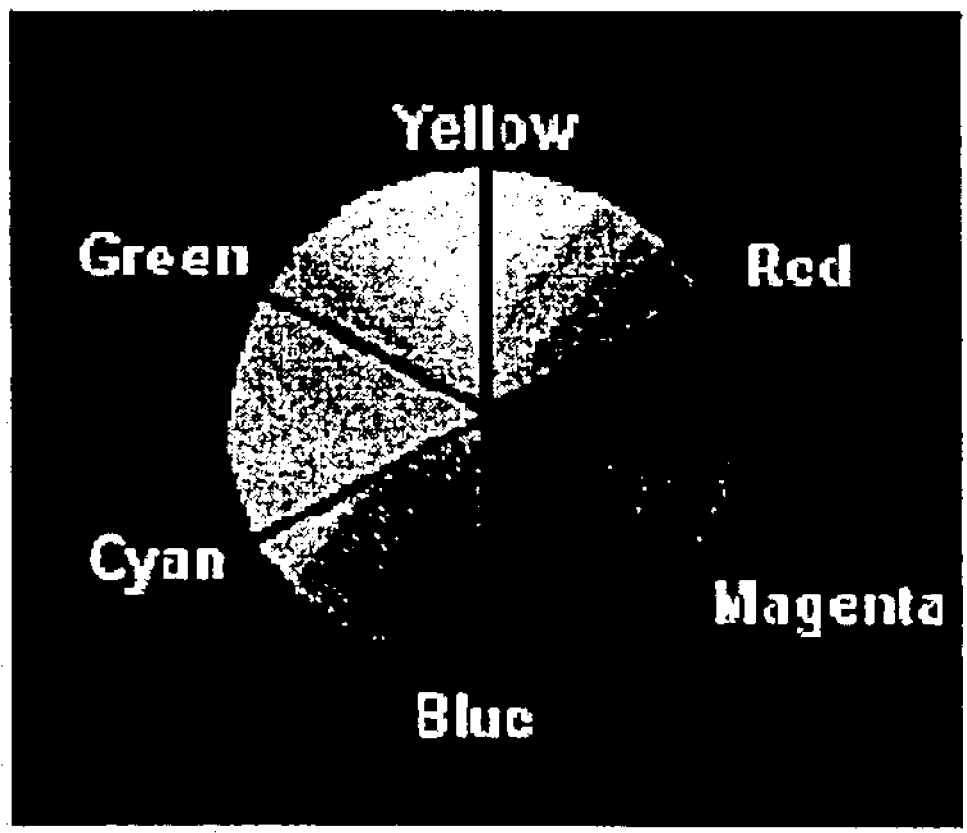
FIG. 3 is a view illustrating an exemplary original image.

FIG. 3 shows the original image associated with the simulation results, and FIGS. 4 to 9 will be described with reference to the original image.

Figure 4:
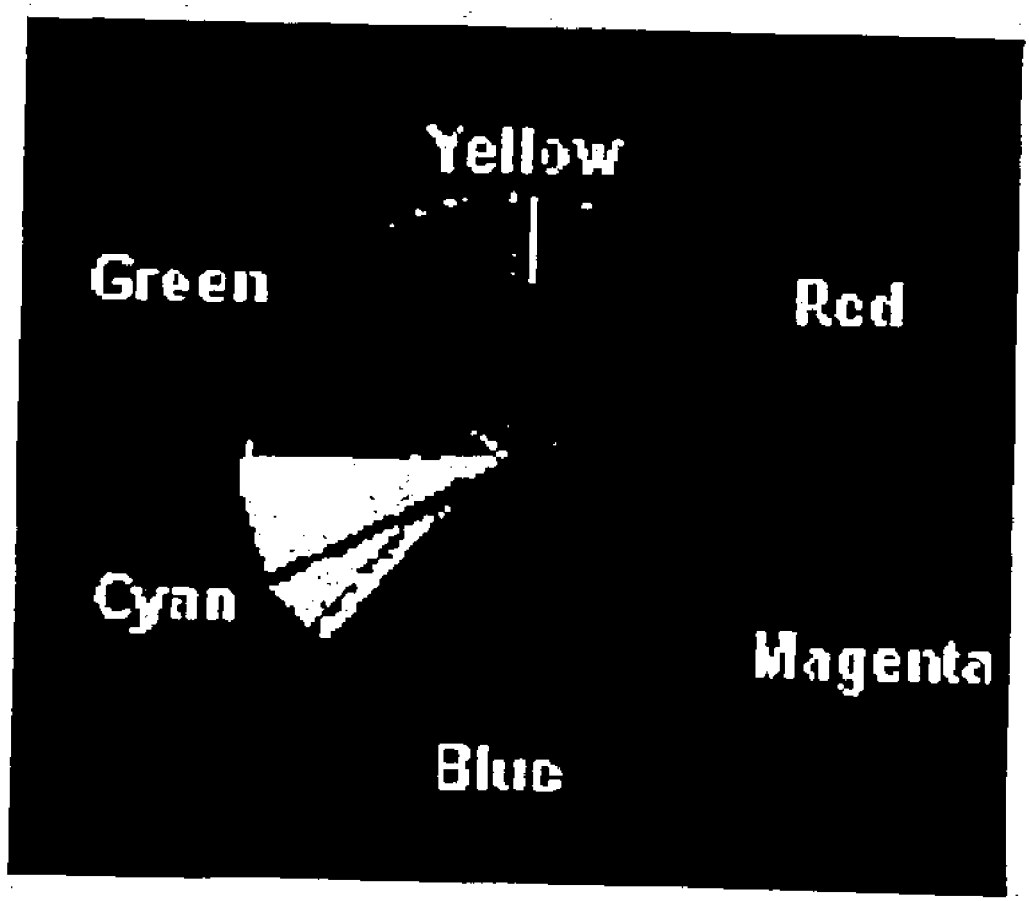
FIGS. 4 to 9 are views illustrating results of simulations where the original image shown in FIG. 3 is processed in accordance with the present invention.

FIG. 4 shows the case where the boundary value is set to the angle 360° (being the same as the angle 0°) when the primary color is black and the secondary color is red. In this case, the boundary color is red. A color similar to the red color is converted into the red color being the boundary color. At this time, the weight values for the primary and secondary colors are not assigned. In this case, it can be found that a conversion to the secondary color is performed in a criterion of the red color being the boundary color. Furthermore, it can be found that green and blue-based colors are converted into the black color being the primary color, and cyan-based colors are converted into the white color.

Figure 5:
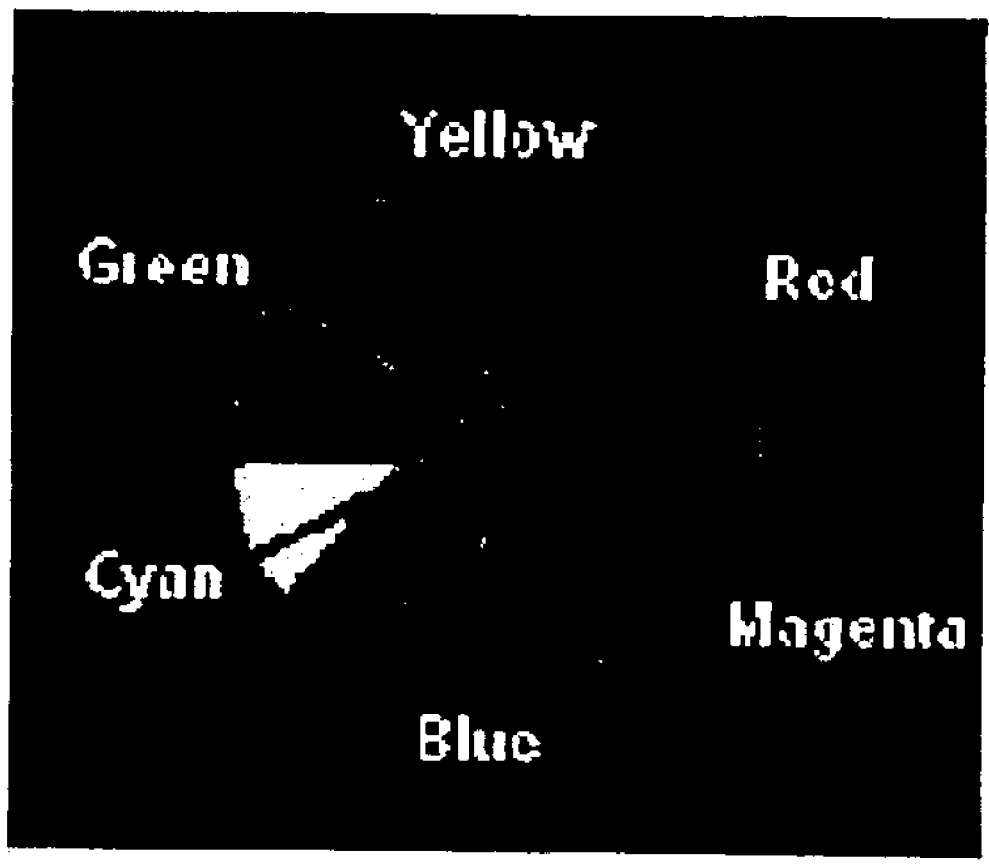

FIG. 5 shows the case where the weight value for the secondary color is assigned to the image shown in FIG. 4. When the primary color is black and the secondary color is red, the boundary value is set to the angle 360° and the weight value Vcs for the secondary color is set to be large. When the image shown in FIG. 5 is compared with that shown in FIG. 4, it can be found that a color area converted into the secondary color in a criterion of the red color being the boundary color is wider in the image shown in FIG. 5. If the weight value for the secondary color is set to be large, a ratio of the secondary color becomes large in the two-color image.

Figure 6:
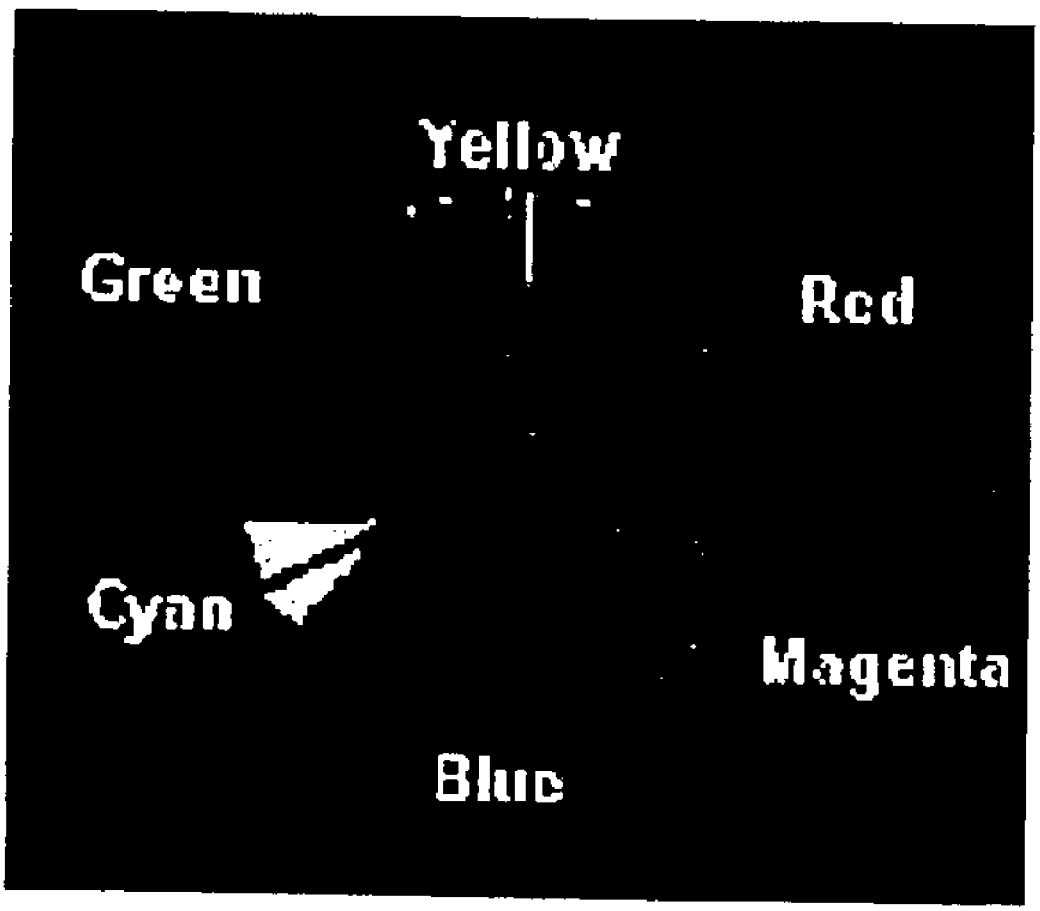

FIG. 6 shows the case where the weight value for the primary color is assigned to the image shown in FIG. 4. When the primary color is black and the secondary color is red, the boundary value is set to the angle 360° and the weight value Vcb for the primary color is set to be large. When the image shown in FIG. 6 is compared with that shown in FIG. 4, it can be found that an area of the black color being the primary color is wider and hence an area of the secondary color in a criterion of the red color being the boundary color is narrower in the image shown in FIG. 6. If the weight value for the primary color is set to be large, a ratio of the primary color becomes large in the two-color image.

Figure 7:
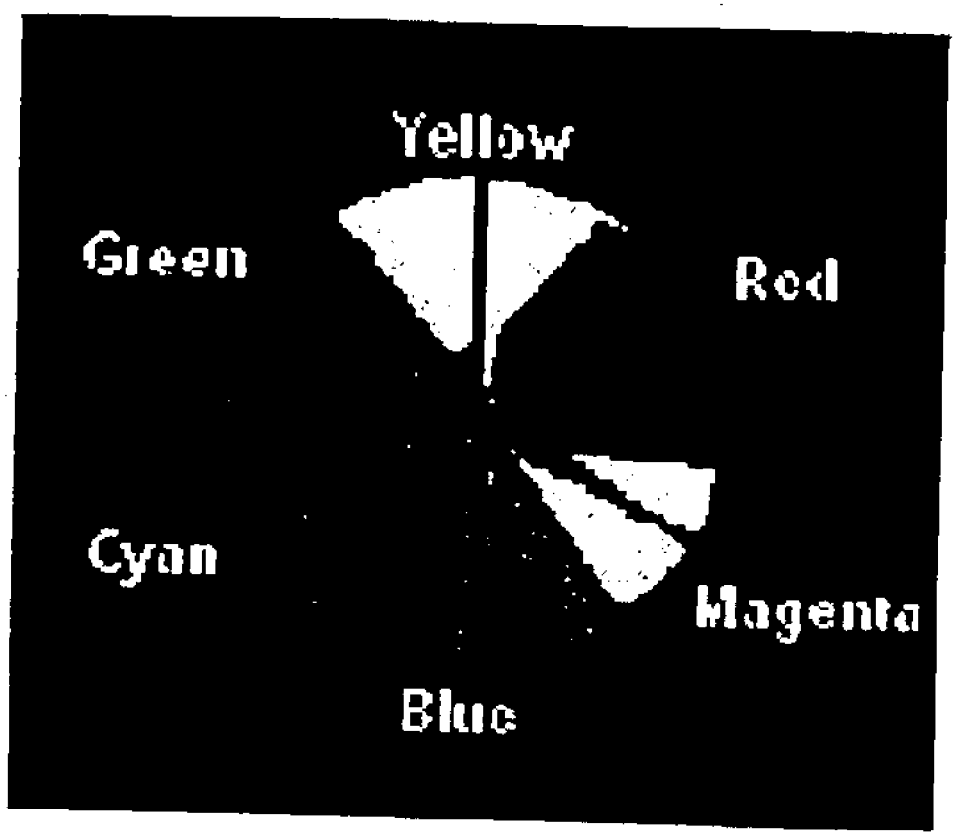

FIG. 7 shows the case where the boundary value is set to the angle 180° when the primary color is black and the secondary color is red, and no weight value is assigned. The boundary color is cyan and cyan-based colors are converted into the secondary color (or Red) in a criterion of the cyan. Red-based colors are converted into the primary color, and yellow and magenta-based colors are converted into the white color. In other words, the conversion to the secondary color is carried out according to similarity to the boundary color in the criterion of the boundary color rather than similarity to the secondary color. As a result, where various applications are applied to the conversion, various image conversions can be achieved.

Figure 8:
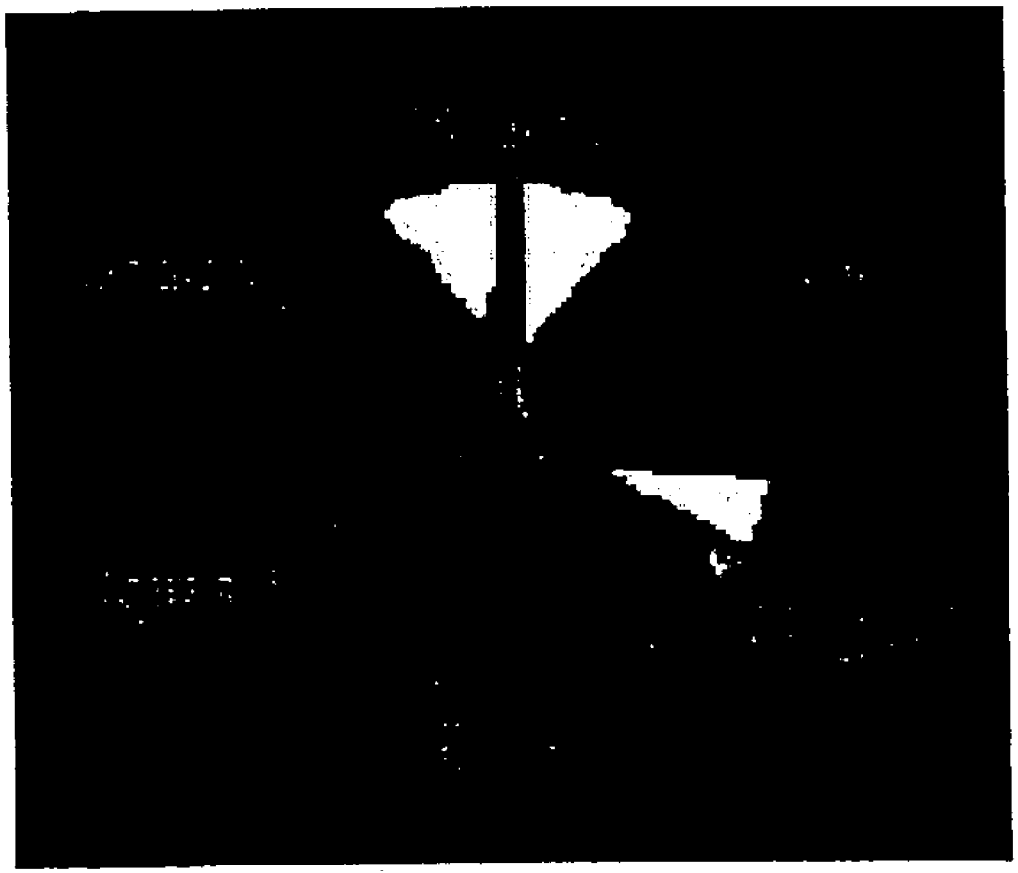

FIG. 8 shows the case where the weight value for the secondary color is set to be large in the image shown in FIG. 7. The primary, secondary and boundary colors are set to the black, red and cyan colors, and the weight value Vcs for the secondary color is set to be large. When the image shown in FIG. 8 is compared with that shown in FIG. 7, it can be found that a color area converted into the secondary color in a criterion of the cyan color being the boundary color is wider in the image shown in FIG. 8 as in a simulation result shown in FIG. 5.

Figure 9:
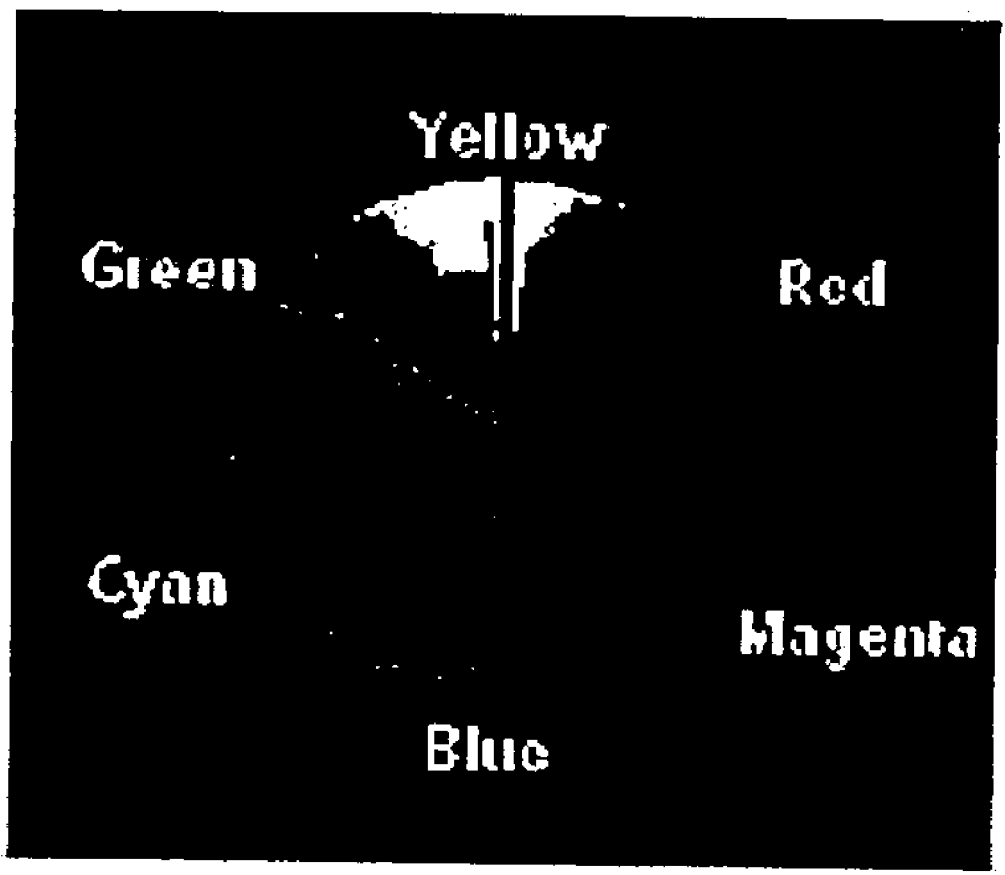

FIG. 9 shows the case where the weight value for the primary color is assigned to the image shown in FIG. 7. The primary, secondary and boundary colors are set to the black, red and cyan colors, and the weight value Vcb for the primary color is set to be large. When the image shown in FIG. 9 is compared with that shown in FIG. 7, it can be found that a color area converted into the primary color is wider and hence a color area converted into the secondary color in a criterion of the cyan color being the boundary color is narrower in the image shown in FIG. 9 as in a simulation result shown in FIG. 6.

As the boundary color, the weight value for the primary color and the weight value for the secondary color can be arbitrarily set, the conversions to various two-color images can be allowed.

As apparent from the above description, the present invention provides a method for processing an image in a printer, which can effectively carry out a conversion operation by comparing quantities of light components for R, G and B associated with each pixel to be converted when a full color image is converted into a two-color image, perform an image conversion operation as desired by a user by carrying out a calculation operation using difference values between quantities of original light components, a primary color and a secondary color and assigned weight values, and decide conversion colors by applying a regular rule to all possible cases when the conversion colors are decided, such that an excellent conversion result can be achieved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for processing an image in a printer capable of printing a two-color image, comprises the steps of:

setting a primary color and a secondary color as printable colors in the printer;

receiving an original image; and converting the original image into the primary, secondary, or white color associated with a smallest color difference value on a pixel-by-pixel basis, calculating a first color difference value $\Delta Col1$ between the corresponding pixel color of the original image and the primary color according to the equation $\Delta Col_1 = |R_0 - R_1| + |G_0 - G_1| + |B_0 - B_1| - Vcb$, calculating a second color difference value $\Delta Col2$ between the corresponding pixel color of the original image and the secondary color according to the equation $\Delta Col_2 = |R_2 - R_0| + |G_2 - G_0| + |B_2 - B_1| - Vcs$, calculating a third color difference value $\Delta Col_3$ between the corresponding pixel color of the original image and the white color according to the equation $\Delta Col_3 = |255 - R_0| + |255 - G_0| + |255 - B_0|$, and converting the corresponding pixel color into a conversion color associated with the smallest color difference value of the calculated color difference values $\Delta Col1$, $\Delta Col2$ and $\Delta Col3$, wherein $R_0$, $G_0$ and $B_0$ are RGB values of the corresponding pixel color of the original image, $R_1$, $G_1$ and $B_1$ are RGB values of the primary color, $R_2$, $G_2$ and $B_2$ are RGB values of the secondary color, values of 255 are RGB values of the white color, Vcb is a weight value for the primary color, Vcs is a weight value for the secondary color, and the weight values Vcb and Vcs are arbitrarily set.

2. The method as set forth in claim 1, further comprising the step of:

converting the received original image into a bitmap image before the color converting step is carried out.

3. The method as set forth in claim 1, wherein the color converting step comprises the step of:

deciding a conversion color according to priorities in order of the primary, secondary and white colors if two or more of the first, second and third color difference values correspond to the smallest color difference value as a result of the comparison.

4. The method as set forth in claim 1, wherein the weight value for the primary color is set to be large if a ratio of the primary color is desired to be increased in the two-color image, and wherein the weight value for the secondary color is set to be large if a ratio of the secondary color is desired to be increased in the two-color image.

5. The method as set forth in claim 1, wherein the color converting step comprises the steps of setting an arbitrary color to a boundary color $R_{th}$, $G_{th}$ and $B_{th}$; and calculating the first color difference value $\Delta Col1$ according to the equation $\Delta Col_1 = |R_0 - R_1| + |G_0 - G_1| + |B_0 - B_1| - Vcb$, calculating the second color difference value $\Delta Col_2$ according to the equation $\Delta Col_2 = |R_{th} - R_0| + |G_{th} - G_0| + |B_{th} - B_0| - Vcs$, and calculating the third color difference value $\Delta Col_3$ according to the equation $\Delta Col_3 = |255 - R_0| + |255 - G_0| + |255 - B_0|$.

6. The method as set forth in claim 5, wherein the color converting step comprises the step of:

deciding a conversion color according to priorities in order of the primary, secondary and white colors if two or more of the first, second and third color difference values correspond to the smallest color difference value as a result of the comparison.

7. The method as set forth in claim 5, wherein the weight value for the primary color is set to be large if a ratio of the primary color is desired to be increased in the two-color image, and wherein the weight value for the secondary color is set to be large if a ratio of the secondary color is desired to be increased in the two-color image.

8. The method as set forth in claim 5, further comprising the step of:

converting the received original image into a bitmap image before the color converting step is carried out.

* * * * *